INVENTORS J. Y. BASKIN
F. R. MICHAEL
BY Lucian C. Canepa
ATTORNEY

United States Patent Office 3,335,410
Patented Aug. 8, 1967

3,335,410
MAGNETIC TAPE FILE PROTECTION ARRANGEMENT

John Y. Baskin, Neptune, and Frank R. Michael, Princeton, N.J., assignors to Bell Telephone Laboratories, Incorporated, New York, N.Y., a corporation of New York Filed Apr. 7, 1965, Ser. No. 446,196
14 Claims. (Cl. 340—172.5)

Figure 1:
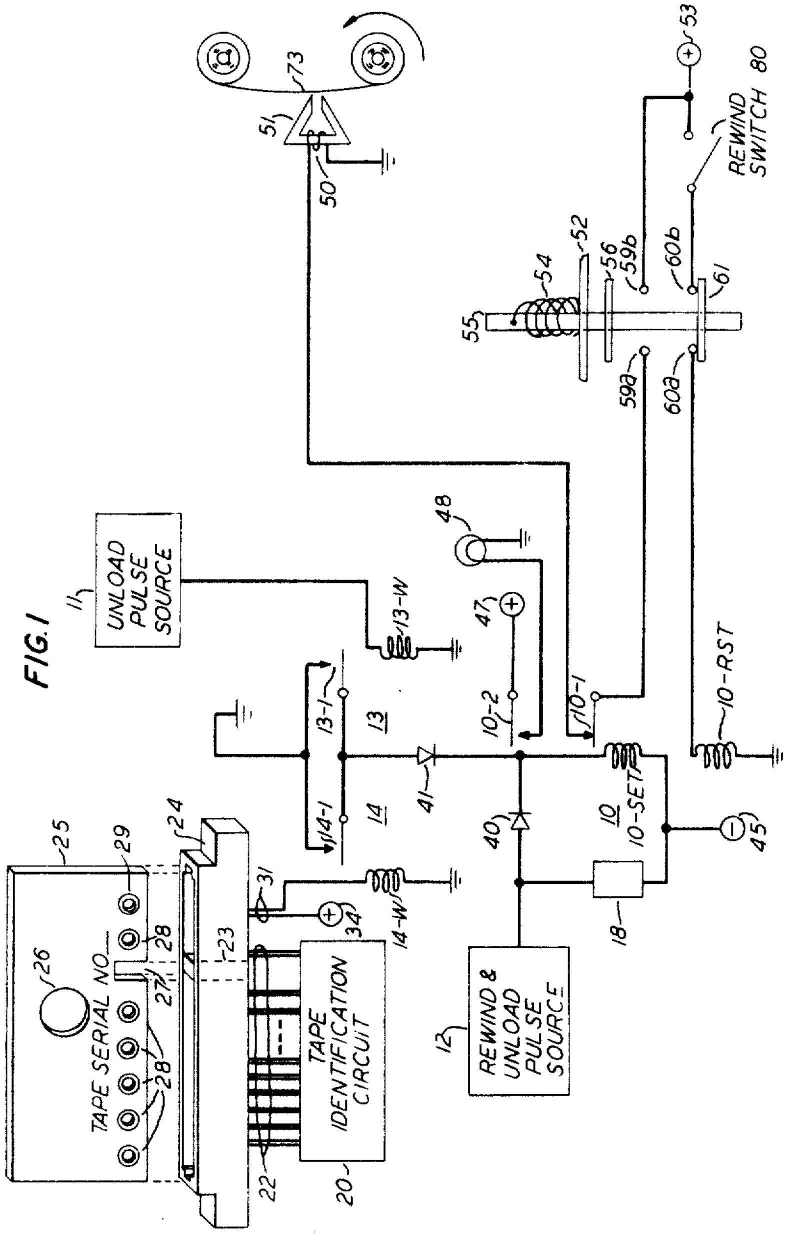

This invention relates to digital information recording and, more specifically, to an arrangement for inhibiting the inadvertent loss of computer-generated digital information stored on magnetic tape.

Magnetic tape has been widely utilized as an information input and output storage medium for employment in conjunction with digital computers. Such use may be attributed to the relatively high operational speed and information storage capacity exhibited by a good quality tape.

However, much valuable computer-associated input and/or output information contained on such tapes is often lost or destroyed through operator errors induced by the rapid activity and commotion which characterizes modern computation centers of even a small size. In particular, if a completed output tape is left on a tape console, an operator may inadvertently reactivate the tape unit for general computer use, mistakenly considering the unit available for such a purpose. The next computer-generated output signals directed thereto would overwrite, and thereby destroy, the previously-stored output information.

A second source of error is created when the serial number identifying an output tape is incorrectly communicated to the computer. When a programmer receives a computer-generated print out, his output information is described therein as being contained on some nonexistent, or at least incorrectly-identified, tape reel. Thus, all benefits of this computation are lost to the programmer. In addition, this error is compounded since the tape reel actually containing the output information, which costs several tens of dollars, is placed in an output tape rack and never claimed, since it has been incorrectly identified. Moreover, the incorrectly-identified tape may actually comprise another programmer's tape. Hence, the information thereon may become lost or destroyed if this tape is mistakenly appropriated responsive to the computer print out.

Finally, there exists a class of tapes often called "vault" tapes, which contain valuable and often irretrievable computation input data. It is generally desired to preserve this data in unmodified form, utilizing these vault tapes as a permanent record thereof. However, when these tapes are placed on a tape console to supply input data for a computational problem, the digital information stored thereon (commonly known as "tape files") is subject to destruction by computer over-writing under certain circumstances, e.g., through operator error.

It is therefore an object of the present invention to provide an improved magnetic tape recording arrangement.

More specifically, an object of the present invention is the provision of an arrangement for file protecting magnetic tape, i.e., protecting the digital information stored thereon.

Another object of the present invention is the provision of a tape storage arrangement which absolutely inhibits the over-writing of valuable computation input data stored on vault tapes.

It is still another object of the present invention to provide a magnetic tape recording arrangement which preserves computer-generated output information.

Yet another object of the present invention is the provision of a magnetic tape storage arrangement which assures a correlation between the serial number identifying an output tape reel and the corresponding number supplied to a programmer in a computer print out.

These and other objects of the present invention are realized in a specific, illustrative, magnetic tape file protection arrangement operative to absolutely inhibit writing on designated "vault" tapes which contain valuable computation input data, and to prevent over-writing on computer output tapes through operator errors. The embodiment includes a pick and latch relay comprising set and reset relay actuating windings, and a normally closed contact pair serially interposed between a tape writing head and a writing source.

The set relay winding is responsive to signals supplied thereto under computer program or system control, or to the incidence of a vault tape, for disabling the tape writing head, thereby file protecting the tape. When the protected tape reel is removed from the tape console, a plunger-actuated switch is operative to enable or condition the relay resetting winding, thereby permitting the associated relay contact pair to be reset.

It is thus a feature of the present invention that a magnetic tape file protection arrangement include a magnetic tape writing head, a relay including set and reset activating windings and a normally closed contact pair serially connected to the writing head, a tape unloading computer-controlled pulse source, circuitry responsive to a signal supplied thereto by the pulse source for energizing the relay set winding, and a mechanically-biased plunger-actuated switch responsive to the presence or absence of a tape to be protected for respectively activating the writing head or the reset winding.

It is another feature of the present invention that a magnetic tape file protection arrangement include a magnetic tape writing head, a relay including set and reset activating windings and a normally closed contact pair serially connected to the writing head, a vault tape identifying structure, circuitry responsive to signals supplied thereto by the tape identifying structure for energizing the relay set winding, and a mechanically-biased plunger-actuated switch responsive to the presence or absence of a tape to be protected for respectively activating the writing head or the reset winding.

It is still another feature of the present invention that a tape storage arrangement comprise a card receptacle including a plurality of distinct binary digit sensing positions, a tape identifying circuit selectively connectable to the card receptacle sensing positions, and a magnetic tape reel identifying card, the card including a plurality of digital positions embodying tape reel identifying information, and one digital position selectively characterizing the tape reel as containing a vault tape.

Figure 2:
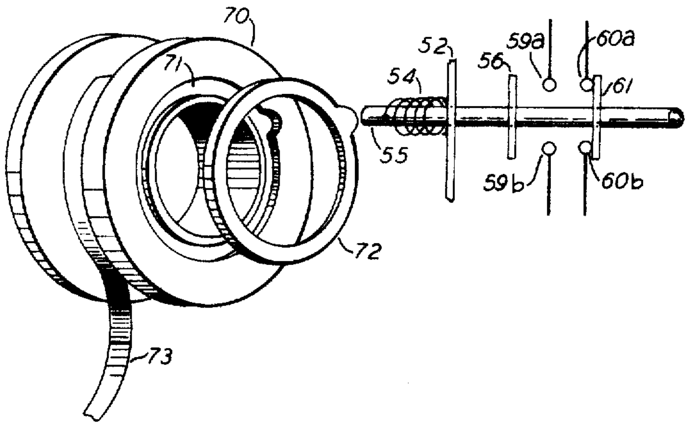

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 comprises a schematic diagram of a specific, illustrative magnetic tape recording arrangement which embodies the principles of the present invention; and FIG. 2 is a diagram depicting in detail plunger-actuated switching circuitry included in FIG. 1.

Referring now to FIG. 1, there is shown a specific, illustrative computer-tape console data translation organization operative to file protect magnetic tapes by absolutely inhibiting writing on specially-designated vault tapes, and to prevent over-writing on computer output tapes. In the discussion which follows, the structural interface between the computer and the tape console will be ignored, as the various commercial embodiments of these units interchangeably include any given circuit element on one unit or the other. The composite arrangement includes a pick and latch relay 10 comprising a set winding 10–SET, a resetting winding 10–RST, and two contact pairs 10–1 and 10–2. The contacts 10–1 and 10–2 reside in a stable closed or open relationship, respectively, when the winding 10–RST has last been energized.

The contact pair 10–1 is serially connected to a winding 50 which is coupled to a magnetic tape writing head 51. In addition, the contact pair 10–1 is serially joined with a positive voltage source 53 via a spring-biased plunger-actuated switch comprising the contact terminals 59*a* and 59*b* and a shorting member 56. The relay 10 resetting winding 10–RST is connected to the source 53 by a tape rewind enabling switch 80 and two contact terminals 60*a* and 60*b* which are selectively interconnected by a plunger-actuated conducting member 61.

The structure embodying the above-mentioned spring-biased switching elements is shown in particular detail in FIG. 2, and comprises an electrically inert plunger 55 mechanically biased to the left by a spring 54 acting against a tape console frame 52. Two independent conducting shorting rings 56 and 61 are mounted on the plunger 55 to selectively connect the contact pairs 59 or 60 respectively associated therewith. A computing tape reel 70, containing a magnetic tape 73 inductively coupled to the FIG. 1 writing head 51, is positioned in a mechanical relationship with the plunger 55 such that the plunger is selectively extendable into an extruded slot 71 included in the reel 70.

When a tape write enabling plastic ring 72 (FIG. 2) is inserted in the slot 71, the plunger 55 is biased to the right against the action of the spring 54. Accordingly, the contacts 60 are electrically isolated while the ring 56 short circuits the contacts 59, thereby partially completing a tape writing conduction path between the source 53 and the writing head enabling winding 50 (FIG. 1). If, however, no tape reel 70 is present, or if no write enabling ring is inserted in a reel 70, the plunger 55 extends to the left into the tape reel slot 71 under the action of the spring 54. In this case, the writing path enabling contacts 59 are disconnected, while the source 53 is connectable through the switch 80 to the relay 10 resetting winding 10–RST via the shorted contacts 60.

Returning now to the FIG. 1 composite file protection arrangement, it is observed that the relay 10 setting winding 10–SET is energized by a negative voltage source 45 when ground potential signals are supplied to the anode of either one of two rectifying diodes 40 or 41 connected thereto. A rewind and unload pulse source 12 is connected to the diode 40, and adapted to selectively generate ground potential pulses under internal computer system control, for example at the end of a specified number of computational problems. Also, two shunt-connected normally open contact pairs 13–1 and 14–1, respectively associated with two relays 13 and 14, are employed to selectively ground the anode of the diode 41.

Other tape-associated control circuitry not relevant to the file protection aspects of the present invention, identified in FIG. 1 as a general load 18, is operative solely in response to pulses supplied by the source 12. Accordingly, the load 18 is connected between the sources 12 and 45, and is electrically isolated from ground signals conducted to the winding 10–SET by the rectifier 41 in view of the blocking effect to such signals produced by the rectifier 40.

The contact pair 13–1 is controlled by a relay energizing winding 13–W which, in turn, is driven by an unloading pulse source 11. The source 11 is operative under stored program control, i.e., by programmer-generated stored instructions, to supply an energizing pulse to the winding 13–W, and to thereby close the contacts 13–1, hence energizing the winding 10–SET.

Associated with each tape reel 70 (FIG. 2) is a plastic card 25 of the type shown in FIG. 1. The card 25 includes a finger-receiving aperture 26 to facilitate the physical use thereof, an eccentrically-mounted groove 27 employed for mounting purposes, and a plurality of metallic feed through type grommets 28 and 29 which electrically connect the two sides of the card at a selected plurality of binary digit identifying positions. More specifically, the grommets 28 are selectively positioned along one edge of the card to embody a binary coding of the serial number of an associated magnetic tape reel 70. The coding embodied by the grommets 28 may be binary coded decimal (BCD), straight binary or any other type well known. The rightmost position on the card contains a grommet 29 only if the corresponding reel 70 contains a vault tape. Otherwise, this position is vacant.

A receptacle 24 for the card 25 is shown in FIG. 1 as connected via a plurality of conducting wire pairs 22 to a tape identifying circuit 20. The circuit 20 is internal to the computer and is functionally adapted to register the tape reel 70 serial number identified by the associated card 25 inserted in the receptacle 24. The computer at some later time transmits the registered tape reel number in a print out to a programmer for purposes of his retrieving the tape reel 70 containing the computation output data, as heretofore discussed. Each wire pair of the plurality 22 is connected by the receptacle 24 to opposite sides of a digital position on the card 25 situated therein. Accordingly, the wire pairs are selectively short or open circuited depending upon the relative presence or absence of a grommet 28 in the card 25 at the sensed position. In addition, the receptacle 24 includes a member 23 which mates with the card aperture 27 for purposes of accurately positioning the card therein.

The vault tape identifying grommet 29 is selectively employed to connect a positive voltage source 34 to a relay 14 energizing winding 14–W by way of a conducting pair 31. Accordingly, a grommet 29 included in a card 25 is operative to activate the winding 14–W, thereby closing the contacts 14–1 and energizing the relay 10 setting winding 10–SET.

Finally, the relay 10 contact pair 10–2 serially joins a voltage source 47 to a lamp 48. As will become more apparent hereinafter, the lamp 48 is illuminated whenever a tape 73 is file protected and, a fortiori, thereby also when a computation involving a vault tape is being effected.

With the above organization in mind, an illustrative system sequencing for the FIG. 1 arrangement will now be described. When a tape reel 70 is inserted in the tape console, the associated card 25 is inserted in the receptacle 24. Since the cards 25 are pre-examined for accuracy, correspondence between the actual and computer-identified output tape reels is assured, thereby vitiating the above-considered problem of "lost" or "non-existent" output tapes.

If the particular tape reel 70 utilized includes input vault tape information, a grommet 29 on the card 25 is operative to energize the relay winding 14–W, thereby closing the contacts 14–1. Responsive to the closed contacts 14–1, a current flows downwards through the winding 10–SET through a circuit path including the contacts 14–1 and the rectifier 41, terminating at the source 45. The energized winding 10–SET is operative to open the normally-closed contact pair 10–1 thereby disabling the writing head 51, and also to close the normally-open contact pair 10–2 to activate the lamp 48. Accordingly, for the duration of the computation involving the vault tape, the lamp 48 is illuminated, and the writing head 51 is disabled.

Upon completion of the computation, the FIG. 1 arrangement retains its above-described state until the reel 70 which included the vault tape and the corresponding card 25 are removed from the tape console. With the tape and associated card removed, two circuit status changes are effected. First, the relay winding 14–W is no longer energized by the source 34 and, accordingly, the contacts 14–1 open. Hence, current through the relay 10 setting winding 10–SET terminates. Also, if the reel 70 had properly included a plastic write inhibiting ring 72, or in any case if this ring were mistakenly omitted, the plunger 55 extends to its leftmost position in FIG. 2 following the removal of the reel 70. Thus, under these conditions, the contacts 60 are short-circuited by the conducting member 61. Therefore, when the computation center operator, noticing the illuminated lamp 48, removes the reel 70 and activates the rewind switch 80 for purposes of reactivating the tape unit, the winding 10–RST is energized by the source 53 via the switch 80 and the contacts 60. Responsive to the resulting current which flows through the winding 10–RST, the contacts 10–1 and 10–2 are respectively closed and opened, thereby partially enabling the writing head 51 and extinguishing conduction through the lamp 48. When the switch 80 is released, current terminates through the winding 10–RST. Thus, following the above operations, the composite FIG. 1 circuit organization is returned to its initial condition, awaiting the insertion of a new tape reel 70 and card 25 for further data processing.

It is observed at this point, that when a reel 70 is inserted in the tape console without a write enabling plastic ring 72, the plunger 55 extends into the reel slot 71, thereby disabling the writing head 51. Hence, any tape writing without the ring 72 is automatically inhibited.

Assume now that an output tape reel 70 containing a write enabling ring 72 is inserted on the tape console. As the tape 73 is assumed to not contain vault tape information, the card 25 associated with the tape reel 70 does not include a grommet 29. Accordingly, the relay 14 is not activated. Moreover, the plastic ring 72 biases the plunger 55 to the right, thereby completing a tape writing path while interrupting the circuit path through the winding 10–RST.

When tape writing is terminated under computer system control, a ground potential signal is generated by the source 12, causing a current to flow downwards through the relay 10 setting winding 10–SET. Alternatively, if tape writing is terminated under program control, the contacts 13–1 are closed responsive to a pulse supplied by the source 11. In this case also, a current is established in a downwards direction through the winding 10–SET.

In accordance with the discussion hereinabove regarding circuit operation for detected vault tapes, the winding 10–SET, when energized by either of the sources 11 or 12 as discussed above, is operative to close the contact pair 10–2 thereby illuminating the lamp 48, and to open the contacts 10–1 hence disabling the write head 51. With the above conditions obtaining, the output tape 73 is file protected with the lamp 48 notifying the computation center operator of this condition. Since the plunger 55 is biased to its rightmost condition by the tape reel plastic ring 72, the contacts 60 are open-circuited. Thus, if an operator mistakenly tries to restart the tape and activates the switch 80, no effect is noted and the tape remains protected. Thus, only by physically removing the reel 70 from the tape console, thereby extending the plunger 55 to the left, will the tape console be restartable. Hence, when the operator notices the illuminated condition of the lamp 48, and the unloaded state of the reel 70, he is informed that the reel 70 contains a completed output tape. Appropriately, he removes this tape for delivery to a computation center subscriber or, alternatively, for subsequent processing by data outputting structures such as printers or the like, thereby closing the contacts 60. When the operator now presses the switch 80, the reset winding 10–RST is energized, hence restoring the contacts 10–1 and 10–2 to their quiescent states, in the manner described above.

Hence, the FIG. 1 arrangement has been shown by the above to assure a correlation between an actually employed tape reel 70 and a computer-identified output tape reel; to absolutely inhibit writing on a vault tape whether or not an operator has incorrectly inserted a write enabling plastic ring 72 therein; and also to file protect output tapes after writing thereon has been terminated either through program or computer system control. Moreover, a lamp 48, along with the existing state of a tape reel 70 yields a visual indication to a computation center operator of the precise status of the tape 73 in the tape console.

It is to be understood that the above-described arrangement is only illustrative of the application of the principles of the present invention. Numerous other arrangements may be devised by those skilled in the art without departing from the spirit and scope of this invention.

What is claimed is:

1. In combination in a magnetic tape file protection arrangement, a magnetic tape writing head, a relay including set and reset activating windings and a normally closed contact pair serially connected to said writing head, vault tape identifying means, and means responsive to signals supplied thereto by said vault tape identifying means for energizing said relay set winding.

2. A combination as in claim 1, further comprising mechanically-biased switching means responsive to the presence or absence of a magnetic tape to be protected for respectively enabling said writing head or said reset winding.

3. A combination as in claim 2 wherein said vault tape identifying means comprises a card including a plurality of digital locations including a vault tape identifying location, a receptacle for holding said card and sensing said digital information contained thereon, and means responsive to the digital information included at said vault tape location for selectively energizing said relay set winding.

4. A combination as in claim 3 wherein said digital information stored on said card is embodied in a plurality of conducting feed-through grommets selectively placed thereon.

5. A combination as in claim 4 wherein said mechanically biased switch means comprises a tape reel including an annular slot therein, ring means selectively insertable in said slot, mechanically-biased plunger means selectively extendable into said slot in the absence of said ring means, and two contact pairs responsive to the relative positioning of said plunger for selectively residing in an open or short-circuited condition.

6. A combination as in claim 5 further comprising a computer system controlled signal source, a computer programmer controlled signal source, and means responsive to each of said computer signal sources for energizing said relay set winding.

7. In combination, a computer including a tape reel identifying circuit, a tape console connected to said computer, a tape reel insertable on said tape console, permanent card means embodying digital information identifying said tape reel, receptacle means for receiving said card, and means for communicating said tape reel identification information sensed by said card receptacle to said reel identifying circuit.

8. A combination as in claim 7, further including vault tape identifying information included on said card, a tape writing head, and means connected to said card receptacle and responsive to said vault tape information stored on said card for selectively disabling said writing head.

9. In combination, a computer including a tape unloading signal source and a system rewind and unloading signal source, a tape console including a writing head, a bistable relay including set and reset windings and a contact pair serially connected to said writing head, means responsive to signals supplied by said tape unloading source or said system unloading source for energizing said relay set winding, a tape reel mouted on said tape console, and first and second switches selectively activated by said tape reel, said first switch being serially connected to said first contact pair, and said second switch being serially connected with said relay resetting winding.

10. A combination as in claim 9 further comprising vault tape identifying means including a card embodying the vault tape status of said tape reel and a receptacle therefore, and means responsive to the vault tape information sensed by said receptacle for energizing said relay set winding.

11. A combination as in claim 10 wherein said relay further includes a second contact pair, said combination further comprising a lamp and an energy source serially connected by said second contact pair.

12. In combination in a magnetic tape file protecting arrangement, a magnetic tape writing head, a bistable relay including winding means and contact means for disabling said writing head, computer controlled tape terminating signal source means, vault tape identifying means, and circuitry responsive to signals supplied thereto by said tape terminating signal means or said vault tape identifying means for causing said relay winding means and said contact means to disable said writing head.

13. A combination as in claim 12 further comprising mechanically-biased switching means responsive to the presence or absence of magnetic tape to be protected for respectively enabling said writing head or said winding means.

14. A combination as in claim 13 wherein said mechanically-biased switch means comprises a tape reel including an annular slot therein, ring means selectively insertable in said slot, mechanically-biased plunger means selectively extendable into said slot in the absence of said ring means, and two contact pairs responsive to the relative positioning of said plunger for selectively residing in an open or short-circuited condition.

References Cited

UNITED STATES PATENTS 3,199,093 8/1965 Cheney ----------- 340—174.1

ROBERT C. BAILEY, *Primary Examiner.*

R. B. ZACHE, *Assistant Examiner.*